United States Patent
Wakamatsu et al.

(10) Patent No.: US 7,325,952 B2
(45) Date of Patent: Feb. 5, 2008

(54) LAMP AND MOTORCYCLE PROVIDED WITH THE LAMP

(75) Inventors: Katsumitsu Wakamatsu, Shizuoka (JP); Kazuo Nakamura, Shizuoka (JP); Toshiaki Ozawa, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/669,083

(22) Filed: Jan. 30, 2007

(65) Prior Publication Data

US 2007/0177387 A1 Aug. 2, 2007

(30) Foreign Application Priority Data

Feb. 2, 2006 (JP) .............................. 2006-025391

(51) Int. Cl.
*F21V 33/00* (2006.01)

(52) U.S. Cl. ...................... 362/473; 362/317; 362/327; 362/333; 362/475

(58) Field of Classification Search ................ 362/317, 362/327, 333, 473, 475
See application file for complete search history.

(56) References Cited

U.S. PATENT DOCUMENTS

| 5,980,067 A | 11/1999 | Albou et al. |
| 6,273,591 B1 * | 8/2001 | Albou ......................... 362/333 |
| 2001/0003506 A1 | 6/2001 | Natsume |

FOREIGN PATENT DOCUMENTS

| DE | 19826905 A1 | 1/1999 |
| EP | 1657111 A2 | 5/2006 |
| JP | 2004-193026 | 7/2004 |

OTHER PUBLICATIONS

European search report for corresponding European patent application No. 07002341 lists the references above, Nov. 4, 2007.

* cited by examiner

*Primary Examiner*—Stephen F Husar
*Assistant Examiner*—Meghan K. Dunwiddie
(74) *Attorney, Agent, or Firm*—Hogan & Hartson, LLP

(57) ABSTRACT

A tail light (lamp) for a motorcycle with improved visibility and outward appearance includes a bulb, a reflector that reflects light from the bulb in a predetermined direction, and a lens that transmits the reflected light. Flux density is varied about a set point, which is distant from the bulb, according to a distance from the set point.

10 Claims, 15 Drawing Sheets

[Fig. 1]
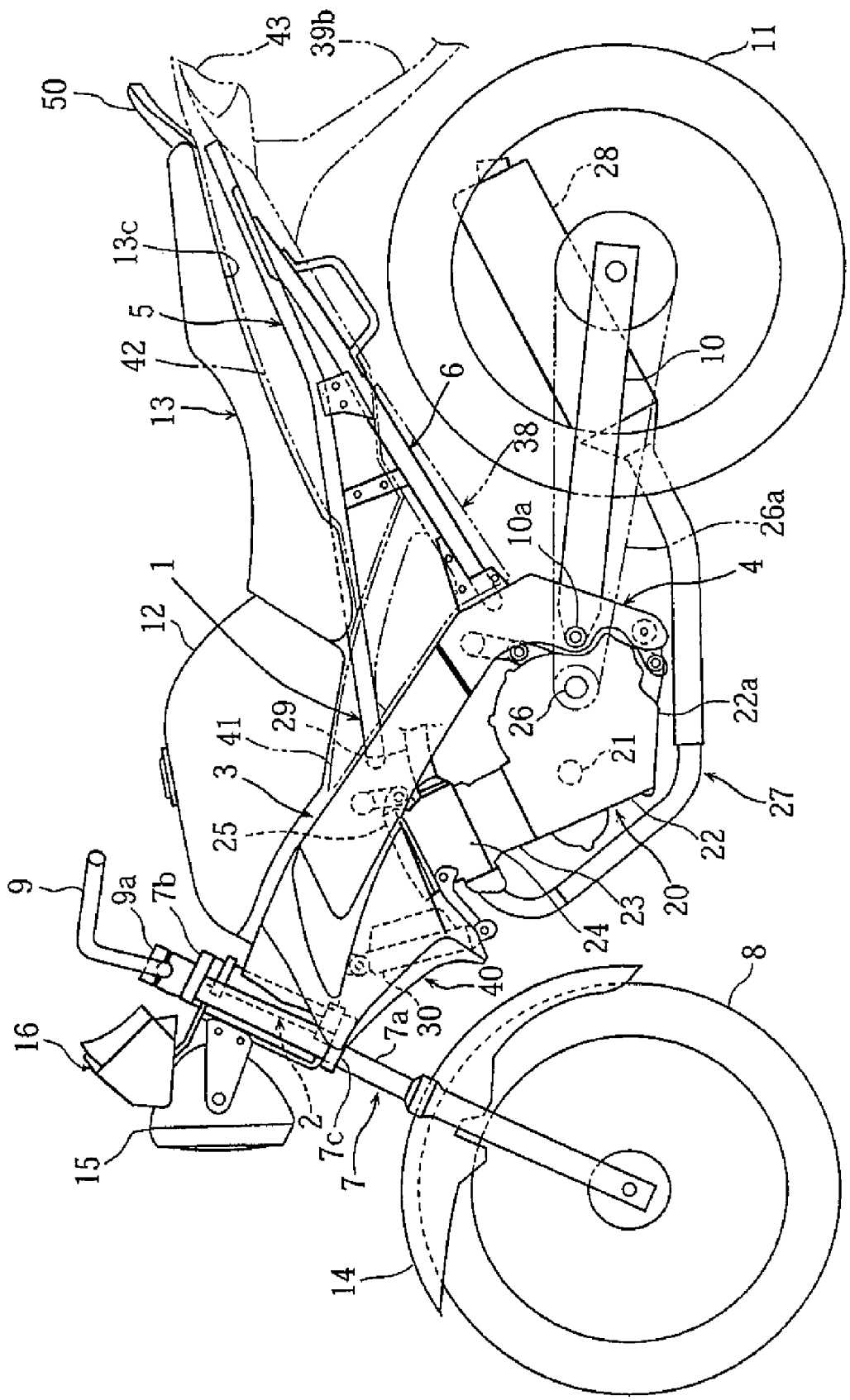

[Fig. 2]
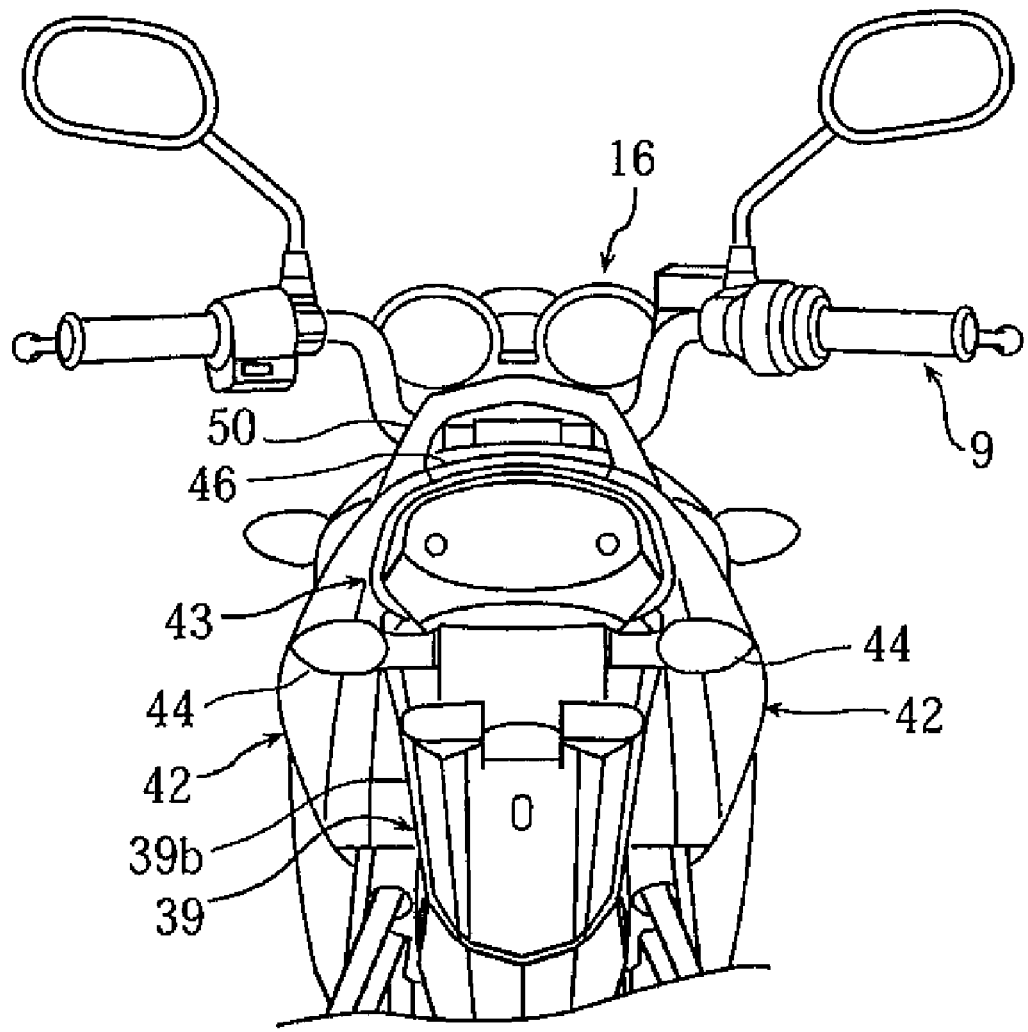

[Fig. 3]
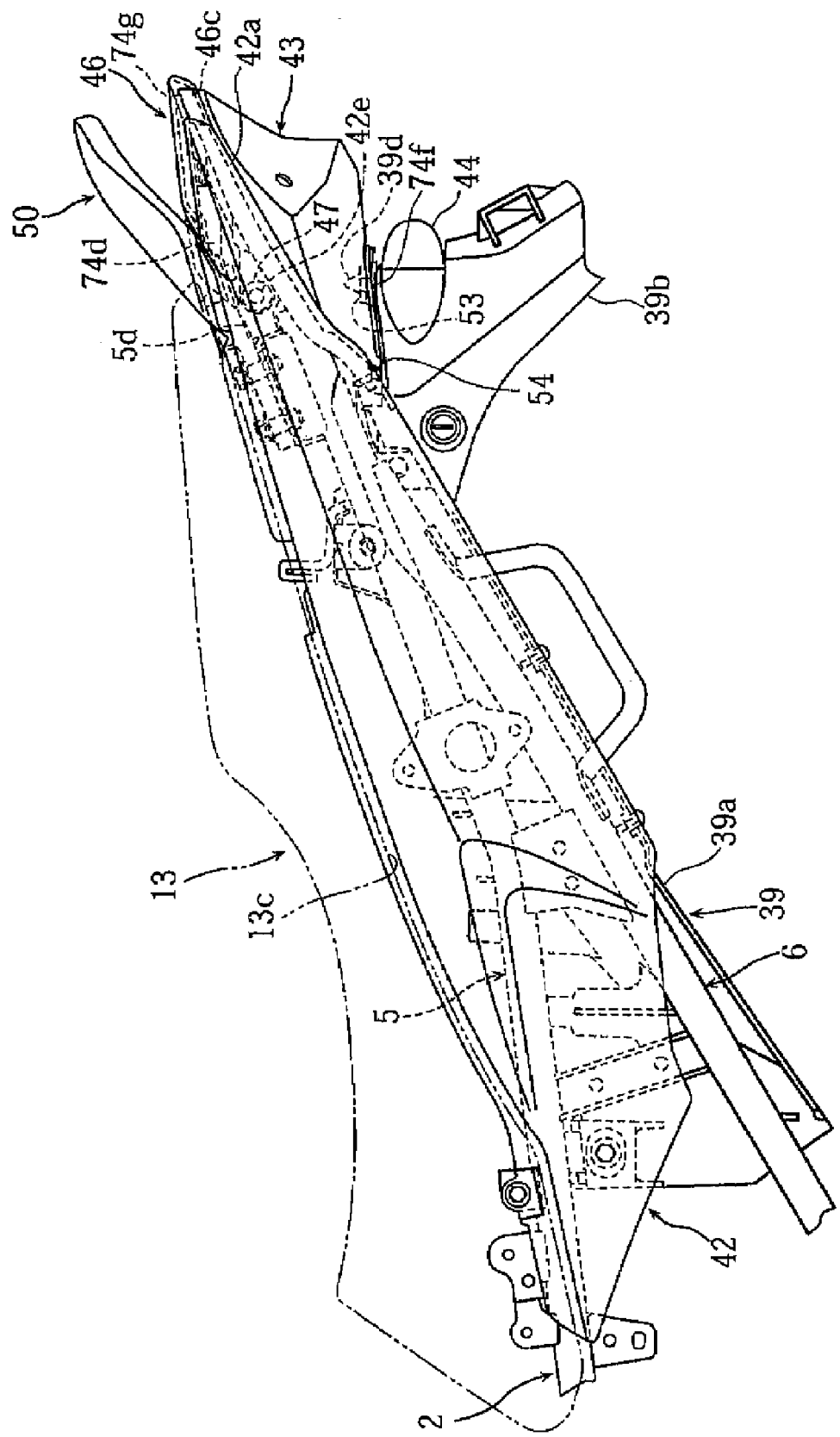

[Fig. 4]
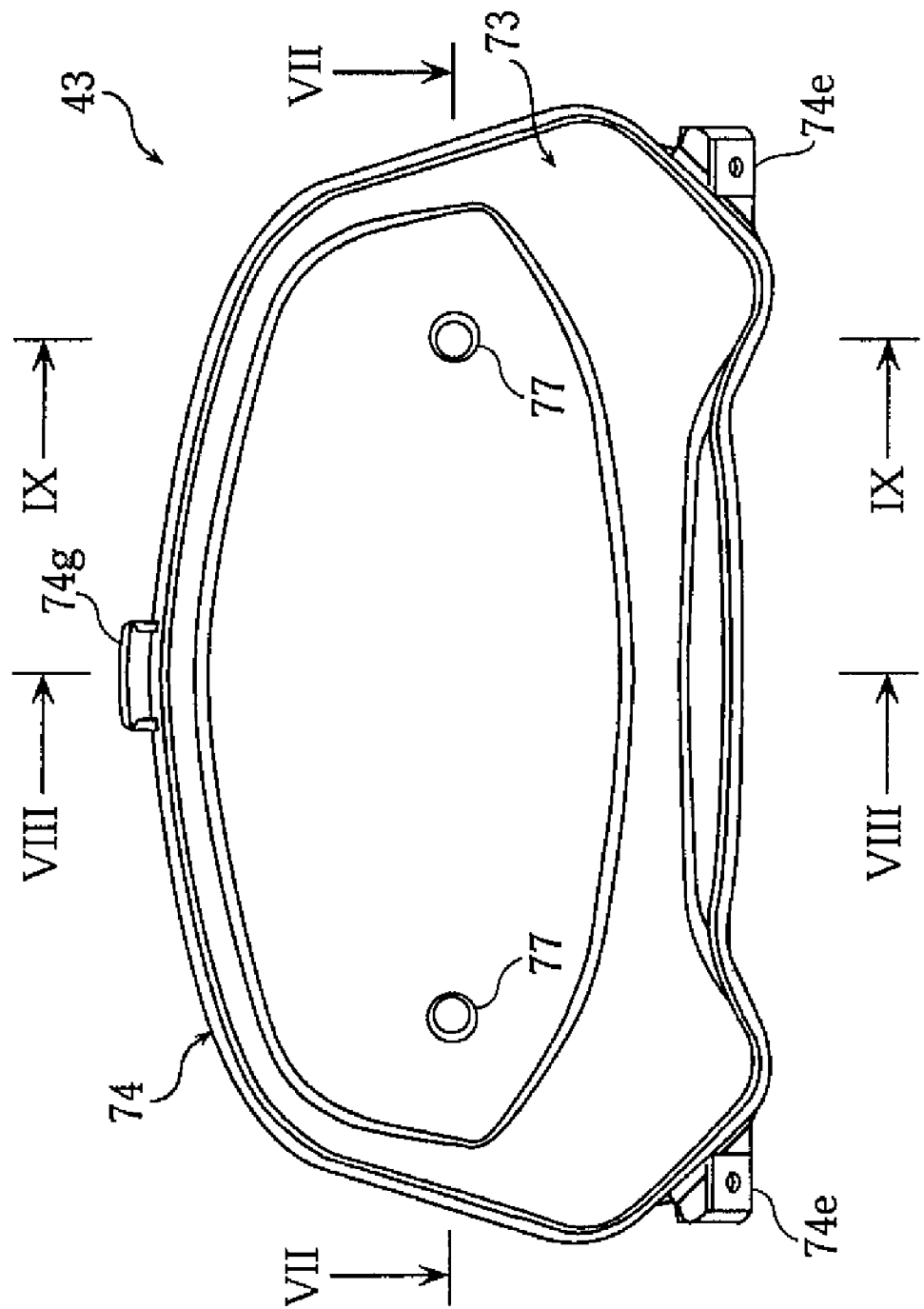

[Fig. 5]
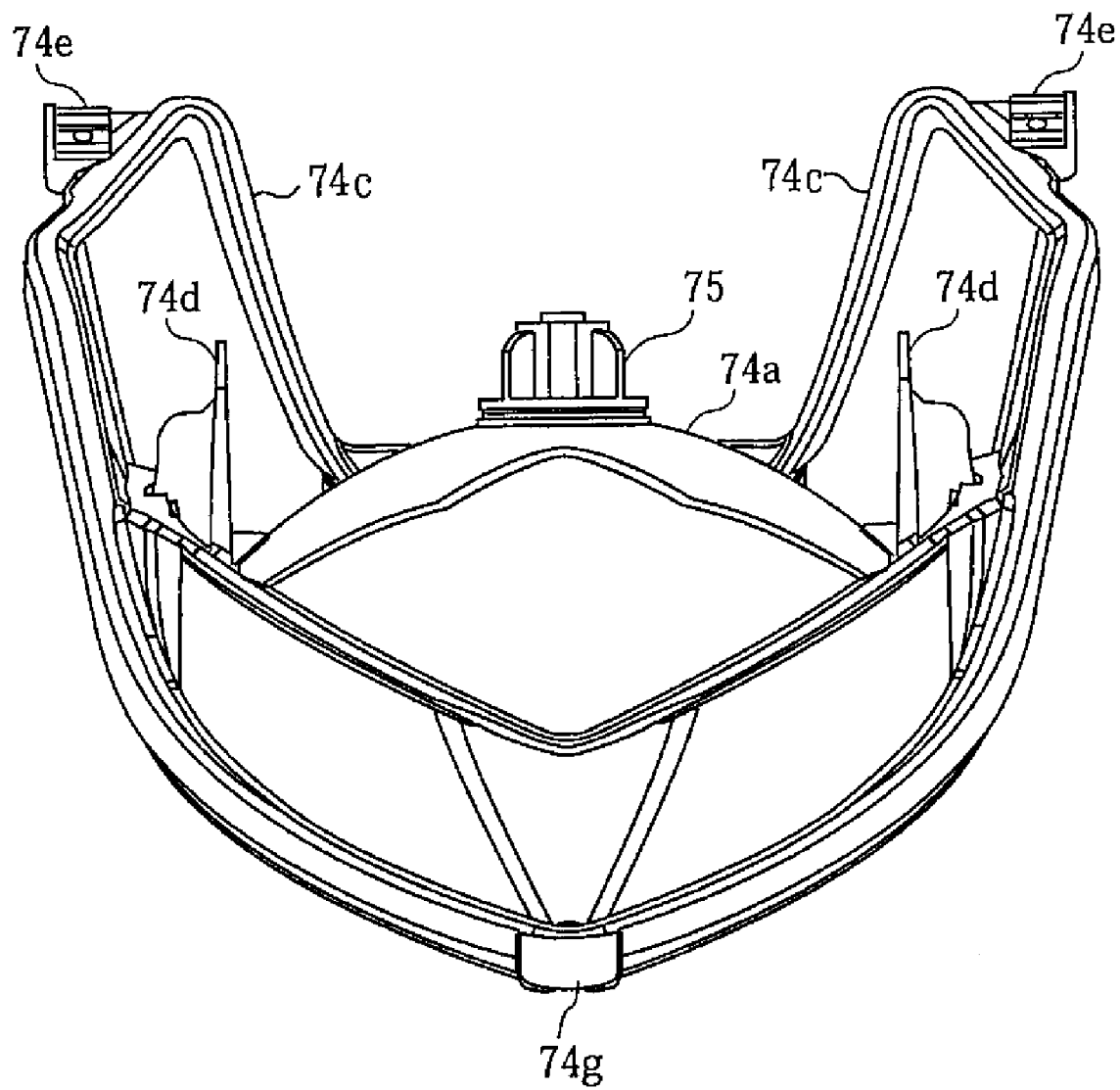

[Fig. 6]
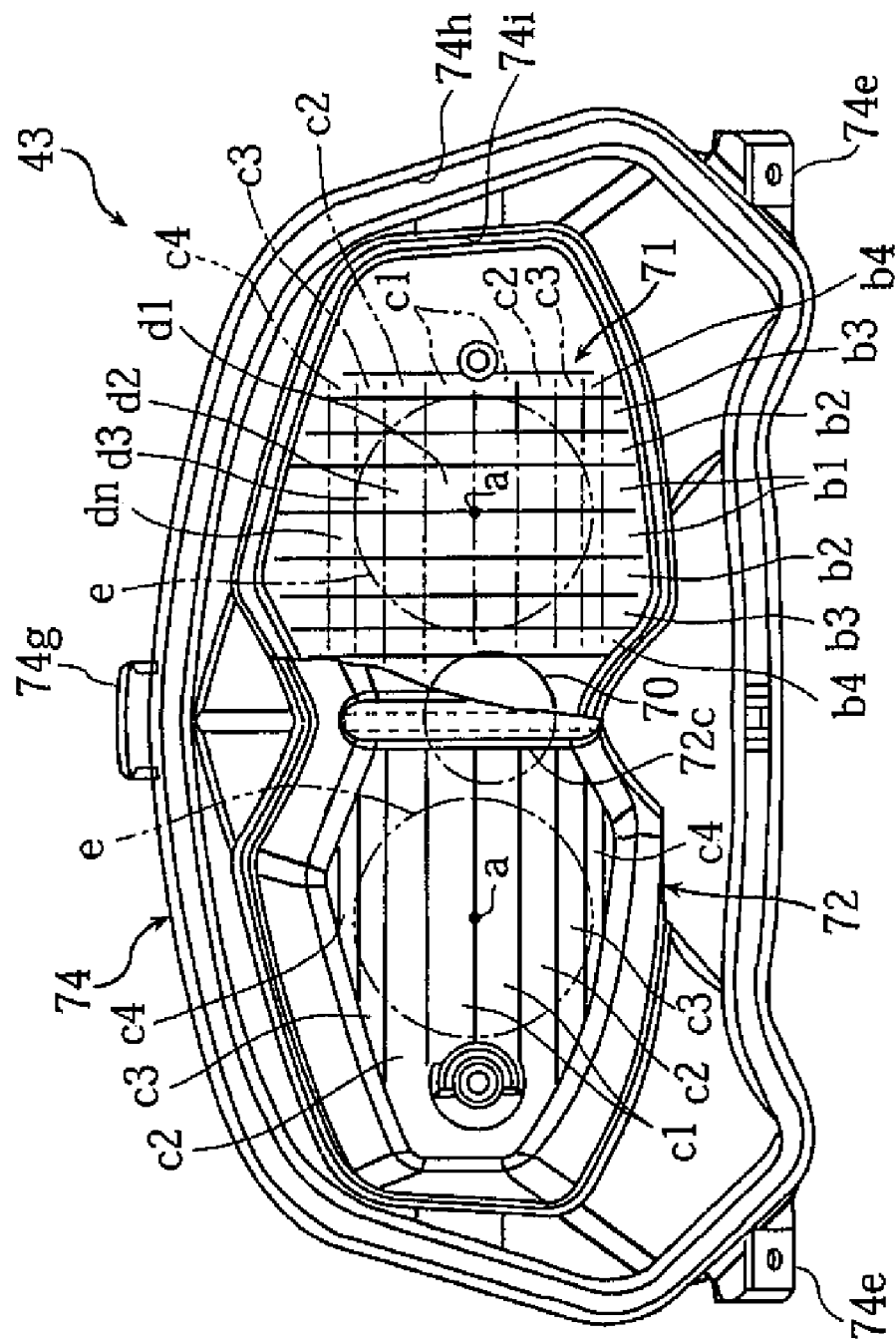

[Fig. 7]
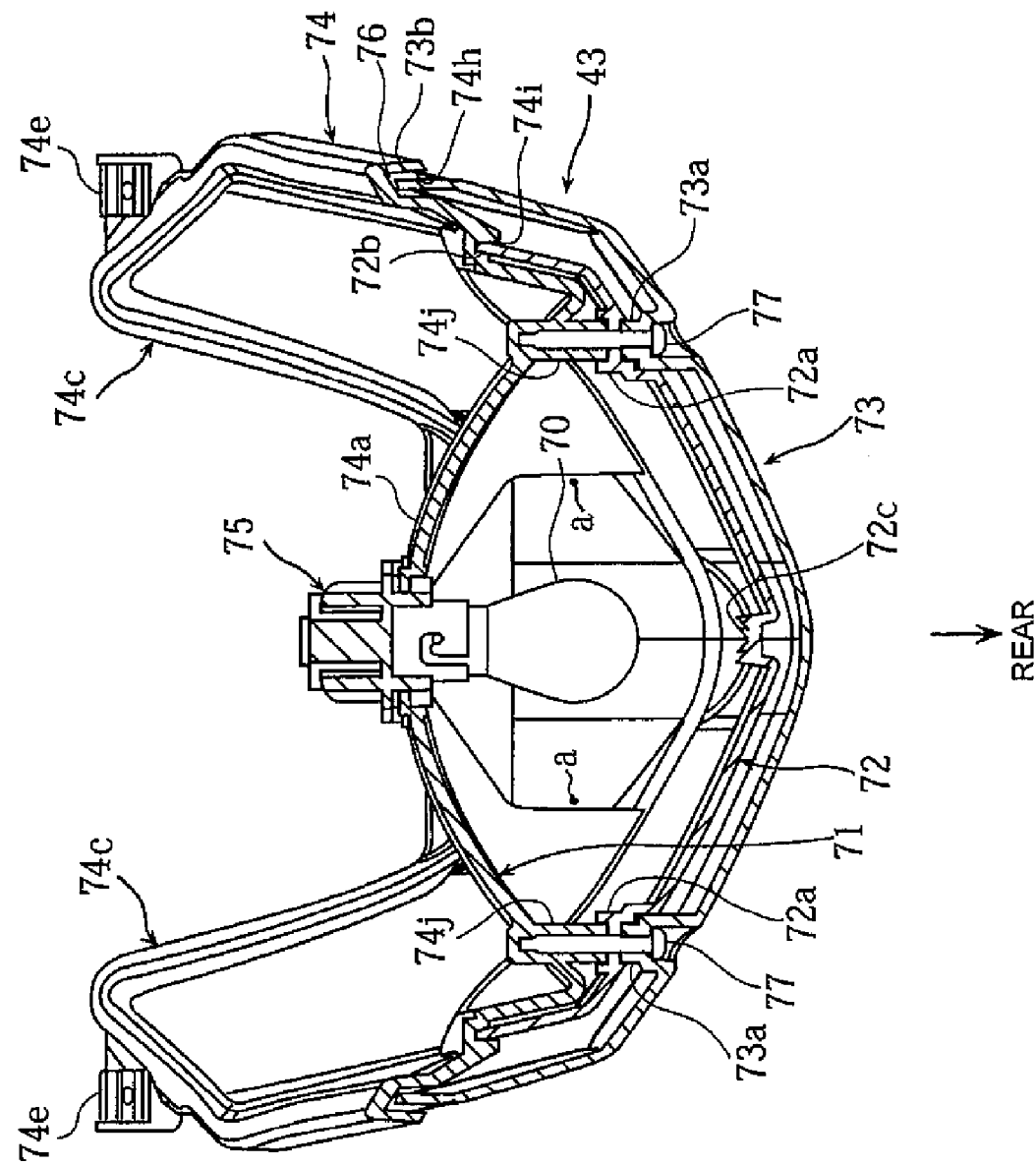

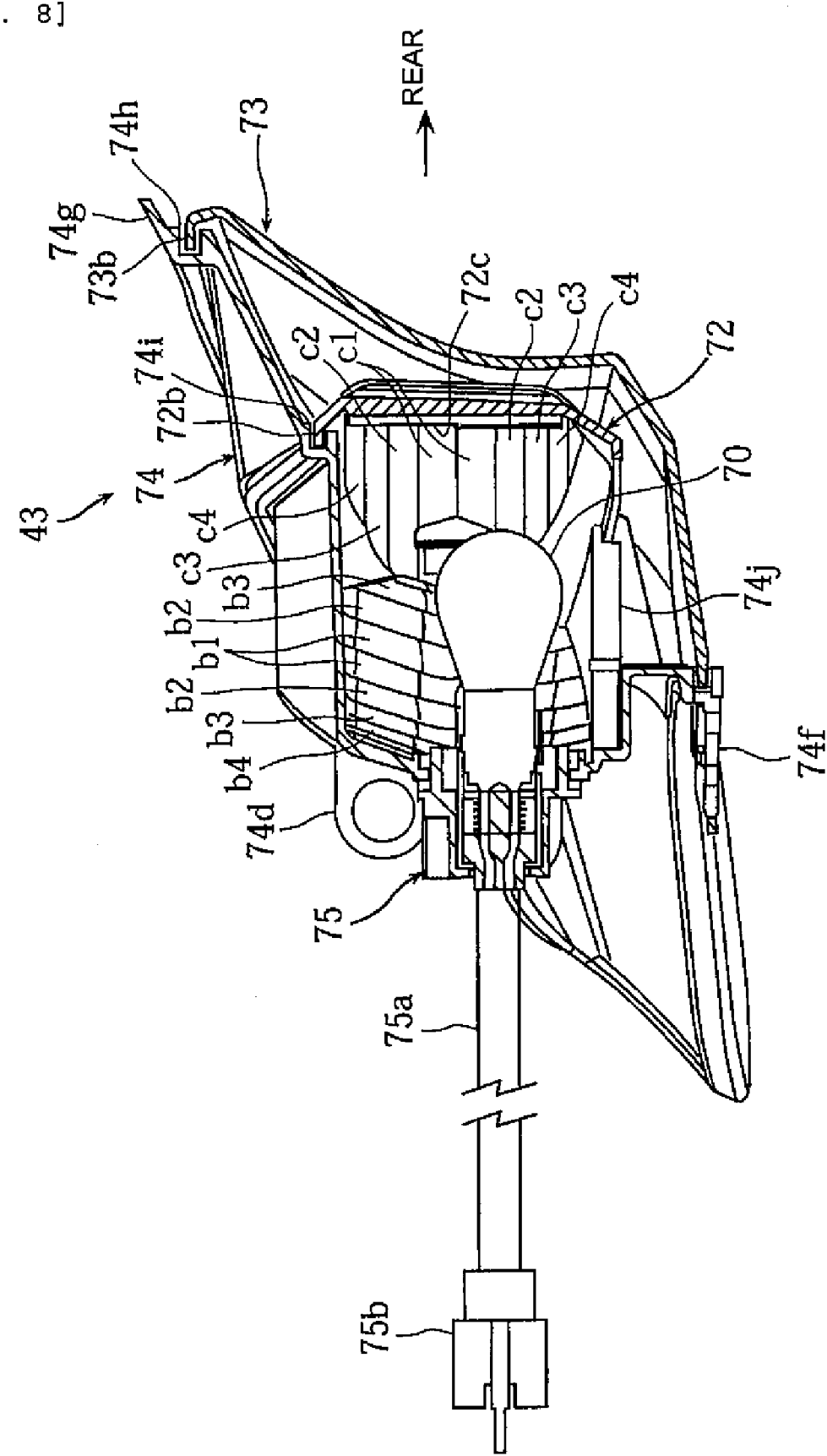
[Fig. 8]

[Fig. 9]
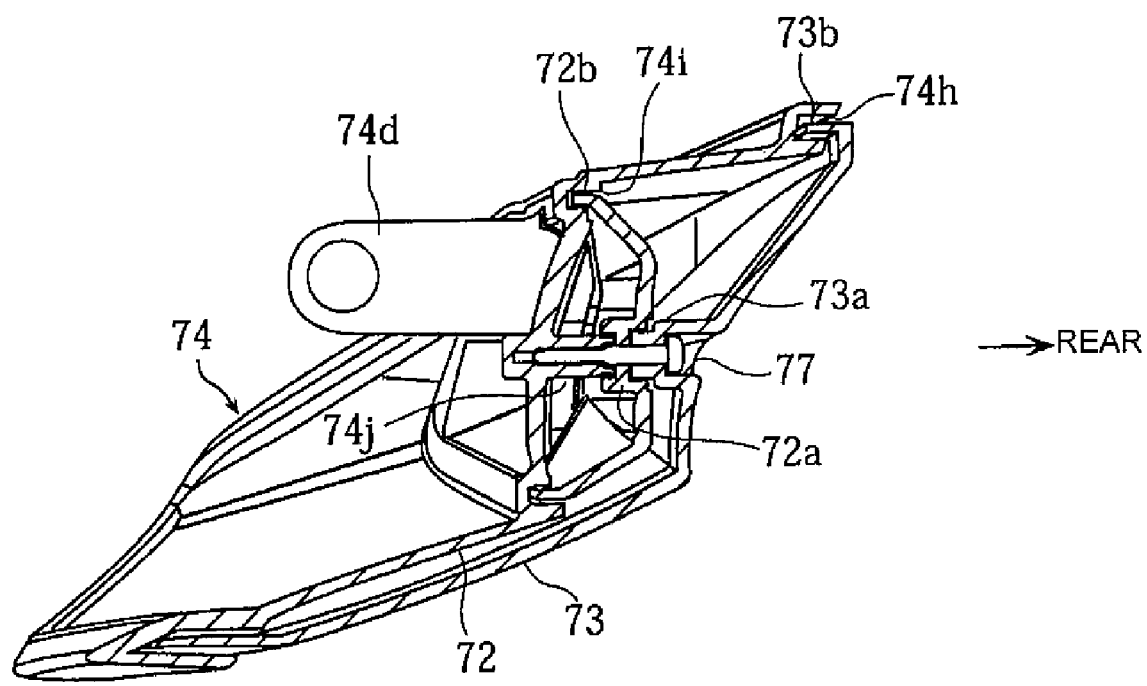

[Fig. 10]
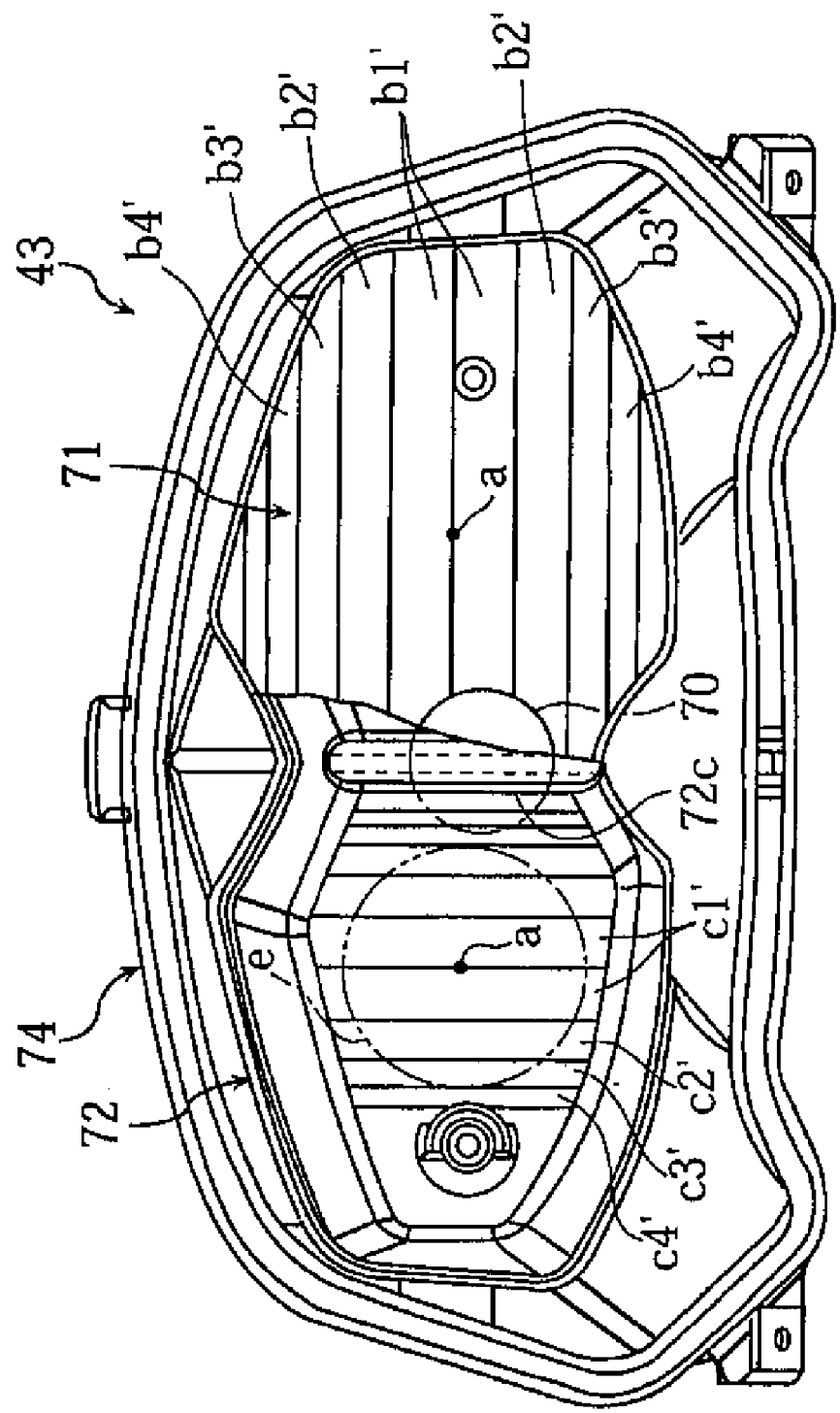

[Fig. 11]
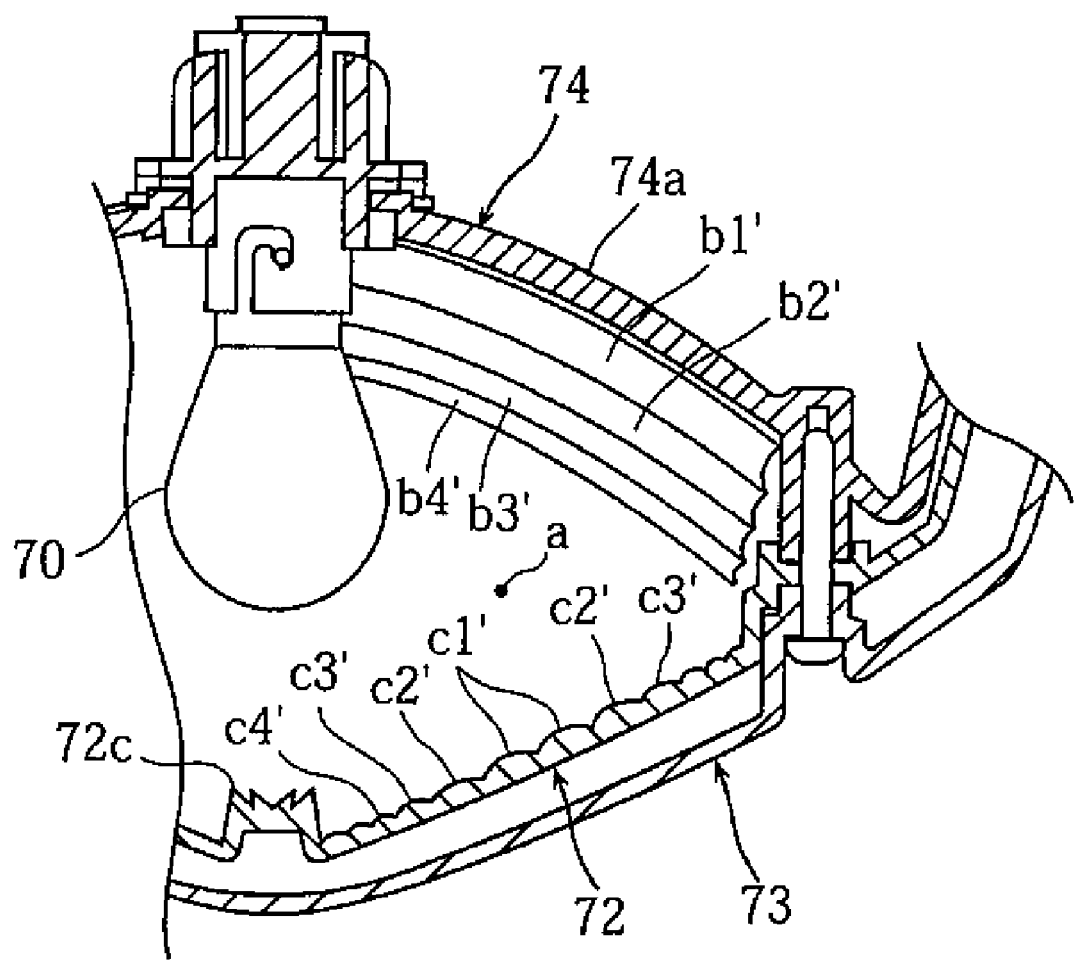

[Fig. 12]
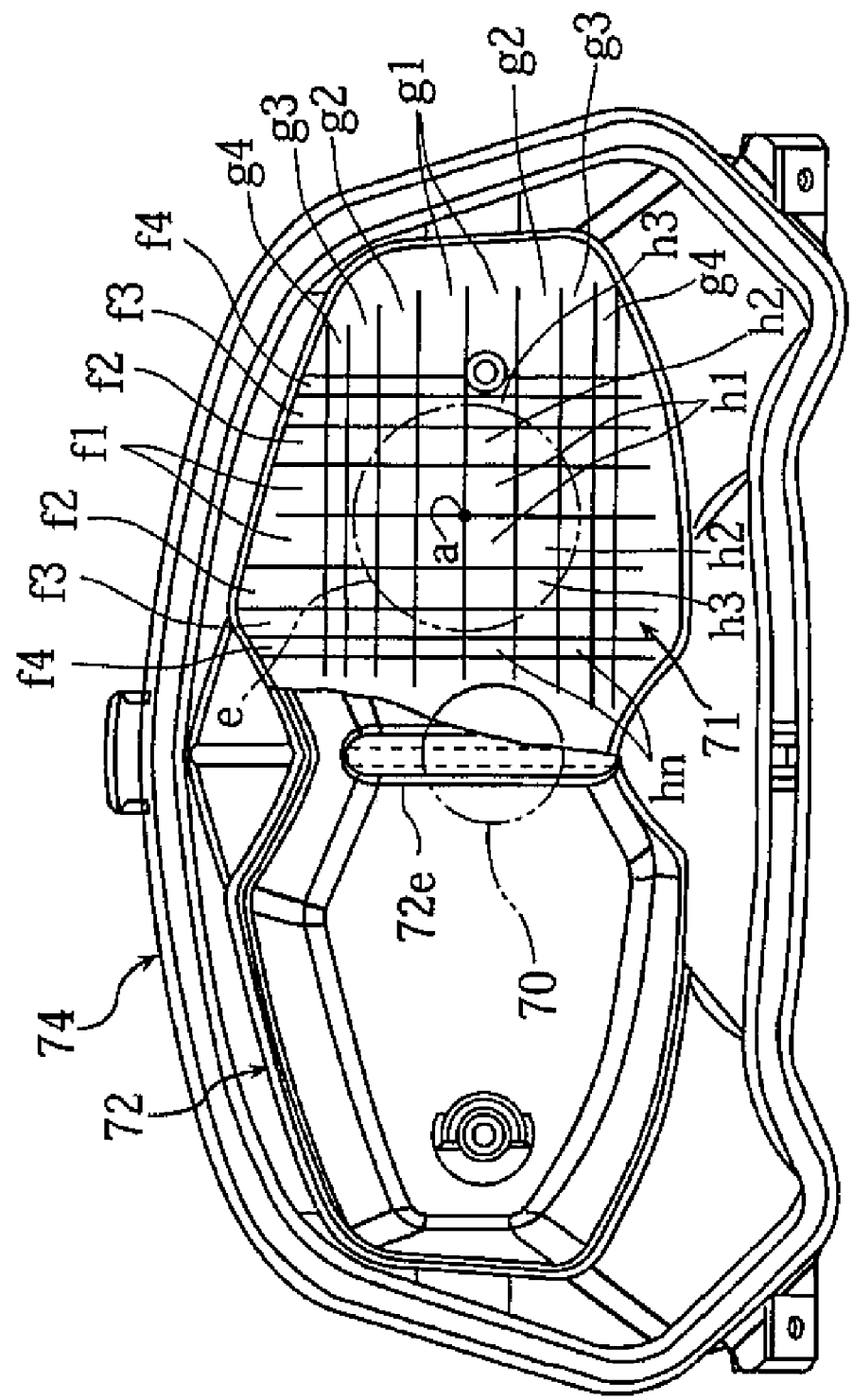

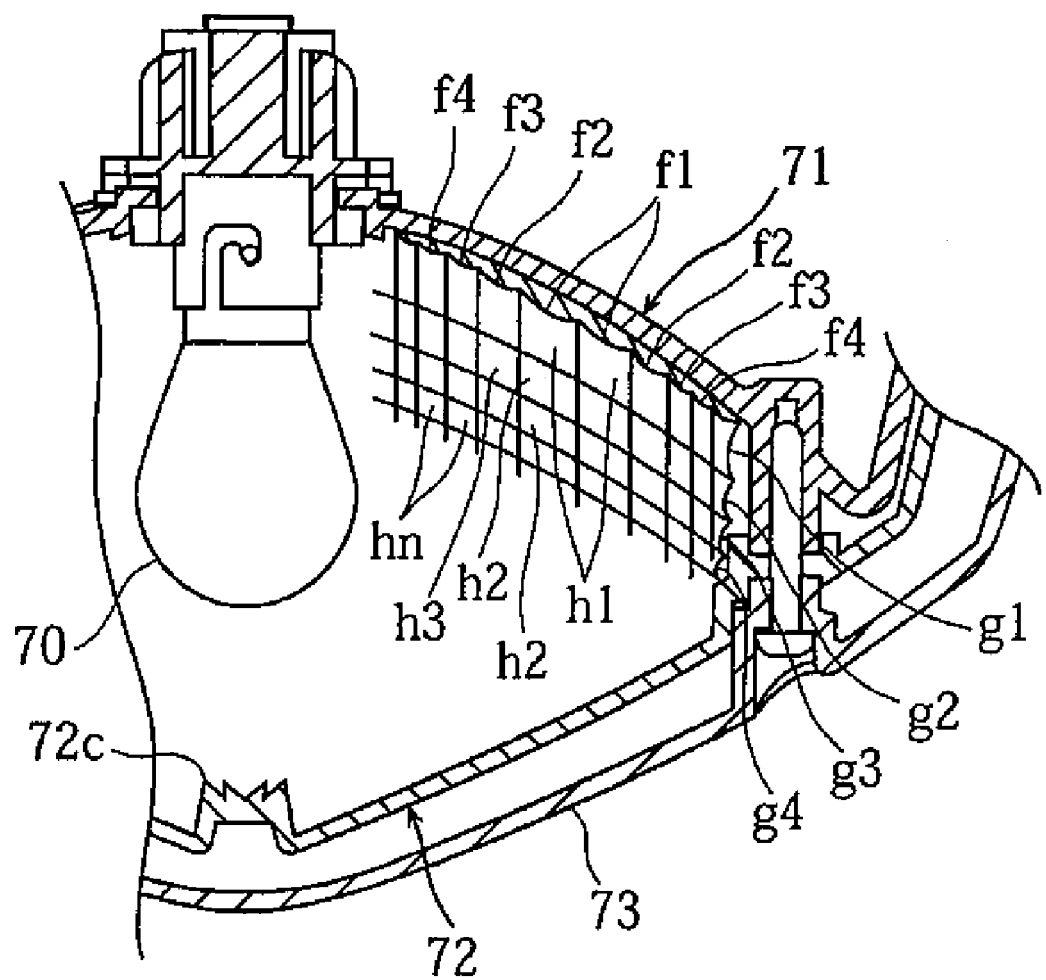
[Fig. 13]

[Fig. 14]
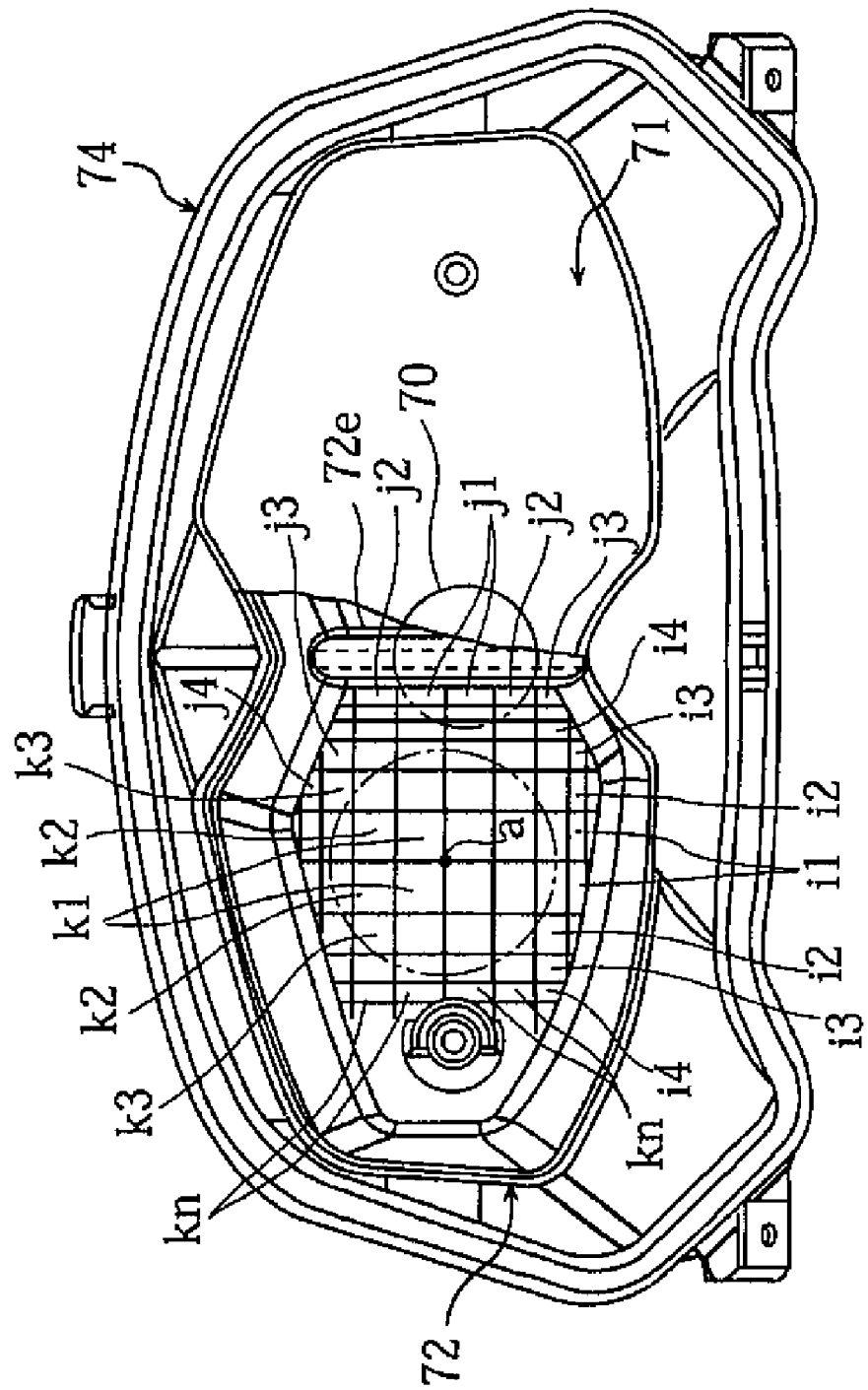

[Fig. 15]
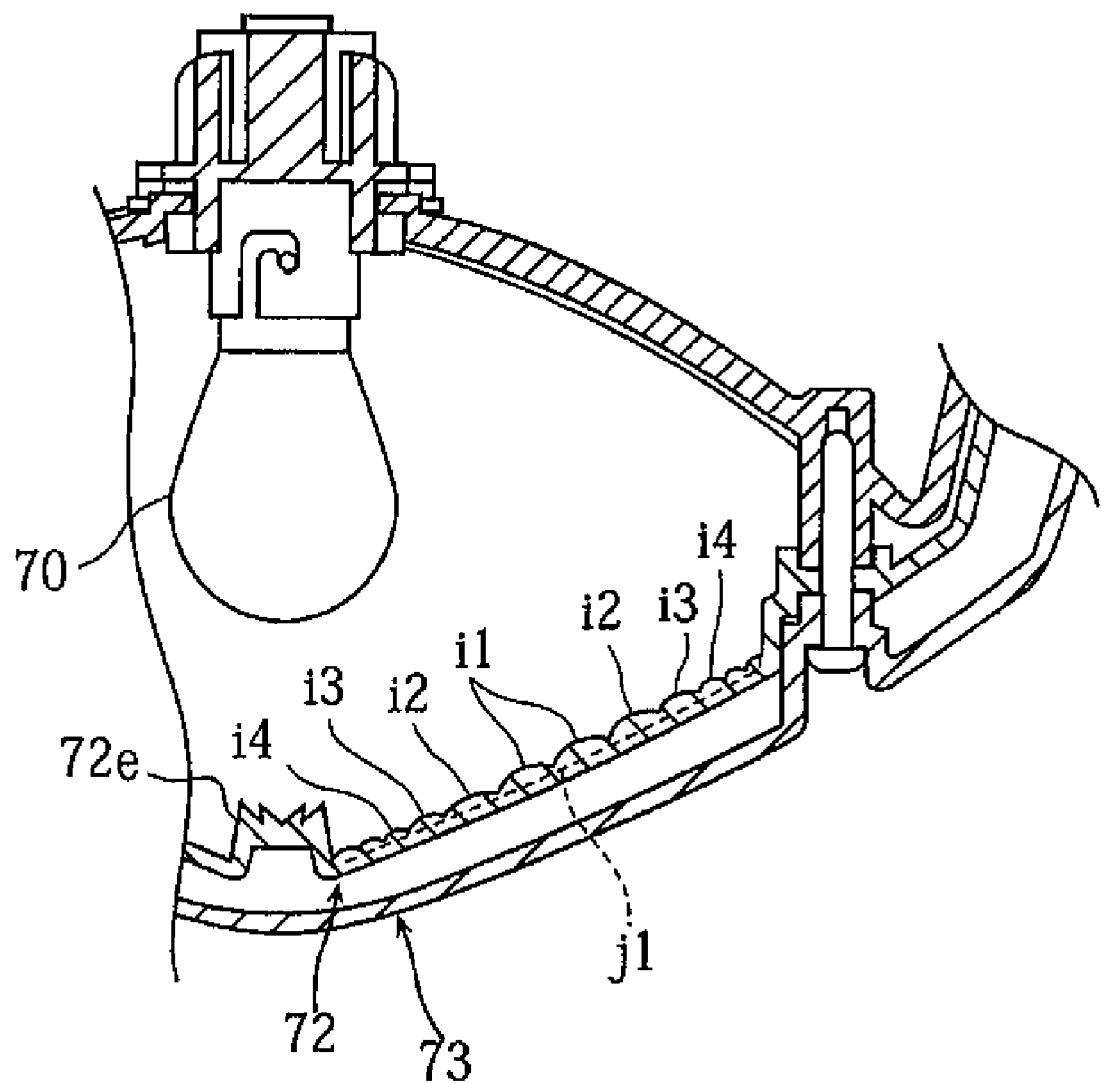

LAMP AND MOTORCYCLE PROVIDED WITH THE LAMP

RELATED APPLICATION

This application claims the benefit of priority under 35 USC 119 of Japanese patent application no. 2006-025391, filed on Feb. 2, 2006, which application is hereby incorporated by reference in its entirety.

BACKGROUND OF THE INVENTION

1. Field of the Invention

The present invention relates to a lamp for a motorcycle.

2. Description of Related Art

Vehicles such as automobiles and motorcycles are often provided with a tail light. In a typical tail light, a plurality of light sources is arranged in one light body to increase rear visibility and to improve outward appearance (see, for example, JP-A-2004-193026).

However, while conventional tail lights improve visibility and outward appearance, they are typically large and lead to increased part cost.

SUMMARY OF THE INVENTION

The invention overcomes these drawbacks and provides a lamp with improved visibility and outward appearance, but without increased cost and size.

A lamp according to the invention comprises a bulb, a reflector that reflects light from the bulb in a predetermined direction, and a lens that transmits reflected light. The flux density is varied about a set point, which is distant from the bulb, according to a distance from the set point.

Since the lamp according to the invention is constructed so that light from the bulb is varied in flux density about a set point, which is distant from the bulb, according to a distance from the set point, the set point distant from the bulb appears as a light source. Thereby, an outward appearance in which light sources appear to be present in a plurality of locations is obtained with one bulb. This feature, which is not present in the related art, provides improved visibility and outward appearance without causing an increase in cost or lamp size.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle provided with a tail light (lamp) according to a first embodiment of the invention.

FIG. 2 is a rear view of the motorcycle on which the tail light is arranged.

FIG. 3 is a side view of the motorcycle on which the tail light is arranged.

FIG. 4 is a rear view of the tail light.

FIG. 5 is a plan view of the tail light.

FIG. 6 is a rear view of the tail light with an outer lens removed.

FIG. 7 is a cross-sectional view of the tail light taken through line VII-VII of FIG. 4.

FIG. 8 is a cross-sectional view of the tail light taken through line VIII-VIII of FIG. 4.

FIG. 9 is a cross-sectional view of the tail light taken through line IX-IX of FIG. 4.

FIG. 10 is a rear view of a modified tail light according to the invention.

FIG. 11 is a cross-sectional view of the tail light of FIG. 10.

FIG. 12 is a rear view of a tail light according to a second embodiment of the invention.

FIG. 13 is a cross-sectional view of the tail light of FIG. 12.

FIG. 14 is a rear view of a tail light according to a third embodiment of the invention.

FIG. 15 is a cross-sectional view of the tail light of FIG. 14.

DETAILED DESCRIPTION OF THE INVENTION

Embodiments of the invention are described below with reference to the drawings.

FIGS. 1-9 illustrate a motorcycle provided with a lamp according to a first embodiment of the invention. In the following description, "front", "rear", "cleft" and "right" refer to directions from the perspective of a rider seated on a seat.

The motorcycle comprises a body frame 1 including a head pipe 2 positioned at a front end thereof, left and right tank rails 3, 3 extending obliquely downward toward the rear from the head pipe 2, left and right rear arm brackets 4, 4 extending downward from the rear ends of tank rails 3, 3, left and right seat rails 5, 5 extending obliquely upward toward the rear from tank rails 3, 3, and left and right seat stays 6, 6 joined together and bridging rear portions of seat rails 5, 5 and rear arm brackets 4, 4.

A front fork 7 is supported on the head pipe 2 to enable steering left and right. A front wheel 8 is journaled by a lower end of the front fork 7, and a steering handle 9 is mounted to an upper end of front fork 7. A front fender 14 is mounted to the front fork 7 to cover an upper portion of the front wheel 8.

A headlight 15 is positioned on the front fork 7 in front of the head pipe 2, and a meter device 16 including a speed meter, a tachometer, etc. is positioned above the headlight 15.

A front end of a rear arm 10 is pivotally supported on rear arm brackets 4, 4 through a pivot shaft 10a to be able to swing vertically. A rear wheel 11 is journaled by a rear end of the rear arm 10 and a rear suspension (not shown) is arranged between the rear arm 10 and the rear arm brackets 4.

A fuel tank 12 is mounted on tank rails 3, 3 and a double ride seat 13 is mounted on seat rails 5, 5 rearwardly of the fuel tank 12. A glove bar 50 grasped by a rear seat occupant is arranged at a rear end of the seat 13.

A water-cooled 4-cycle engine 20 is mounted below tank rails 3, 3. The engine 20 comprises a cylinder block 23, a cylinder head 24, and a head cover 25 laminated on a crank case 22 in which a crank shaft 21 is arranged horizontally in a vehicle width direction.

A transmission case 22a housing therein a transmission (not shown) is formed integrally and rearwardly of the crank case 22. An output shaft 26 is arranged on the transmission case 22a to take out engine rotation through the transmission, and the rear wheel 11 is rotationally driven through a chain 26a by the output shaft 26.

An exhaust pipe 27 is connected to a front wall of the cylinder head 24 and passes below the engine 20 to be connected to a muffler 28 arranged laterally rightwardly of the rear wheel 11. An intake pipe 29 is connected to a rear wall of the cylinder head 24, the intake pipe 29 extending between tank rails 3, 3 to be connected to an air cleaner (not shown). A radiator 30 is positioned forwardly and upwardly of the engine 20 to maintain an engine cooling water at a predetermined temperature.

Front ends of tank rails 3, 3 and an outside of the radiator 30 are covered by front covers 40, 40 made of a resin. The front covers 40, 40 function as an air scoop to introduce a travel wind into the radiator 30.

The seat rails 5, 5 and outsides of the seat stays 6, 6 are covered by left and right side covers 38, 38 made of a resin. The side covers 38 are partitioned into front side covers 41 and rear side covers 42.

The side covers 42 extend to cover regions between left and right, lower edges 13c of the seat 13 and the seat stays 6 and are streamlined in a vehicle longitudinal direction.

Rear fenders 39 covering an upper portion of the rear wheel 11 are arranged on undersides of rear side covers 42, 42. The rear fenders 39 comprise front fender portions 39a extending in the vehicle longitudinal direction to cover lower sides of seat stays 6, 6, and rear extending obliquely rearwardly and downwardly from rear ends of the front fender portions 39a.

Rear ends 42a, 42a of rear side covers 42, 42 extend rearward of a rear edge of the seat 13. A rear cover 46 is arranged between the left and right rear ends 42a, 42a to connect the rear ends 42a together to make the same a substantially continuous surface.

A tail light (lamp) 43 is arranged in an opening surrounded by the rear cover 46, the left and right rear ends 42a, 42a, and the rear fender portions 39b. Also, left and right flasher lights 44, 44 are arranged on the rear fender portions 39b below the tail light 43.

As viewed from the rear, the tail light 43 is substantially elliptical-shaped to have a major axis directed in the vehicle width direction and to be sized to extend over a whole width between inner edges of the left and right rear side covers 42, 42.

The tail light 43 comprises one lamp bulb 70, which is a light source, a reflector 71 that reflects light from the lamp bulb 70 toward the rear of the vehicle, an inner lens 72, through which light reflected from the reflector 71 is transmitted, and an outer lens 73 that covers the inner lens 72 from the rear of a vehicle.

The inner lens 72 is made of a red-colored resin. The outer lens 73 is made of an achromatic resin. Only the outer lens 73 is exposed outside.

The reflector 71 is formed to make a tail cover 74 made of a resin. The tail cover 74 comprises a reflector recess 74a, which is substantially semi-circular as viewed in transverse section (see FIG. 7) to extend in the vehicle width direction and to be opened rearward, and left and right cover portions 74c, 74c extending toward the front of a vehicle from left and right ends of the reflector recess 74a.

The reflector 71 is formed by covering and forming a reflective surface on an inner surface of the reflector recess 74a by means of chrome plating, or the like. A socket 75 is mounted centrally of the reflector recess 74a in the vehicle width direction and the lamp bulb 70 is mounted to the socket 75 to be detachable from the rear. A connector 75b is connected to the socket 75 via a power cable 75a. When a rider performs a braking operation, the lamp bulb 70 is lighted.

Mount seats 74e, 74e and 74f, 74f, respectively, are formed on front ends and rear ends of the left and right cover portions 74c, 74c and forwardly extending mount pieces 74d, 74d are formed on left and right edges of the reflector recess 74a. A positioning portion 74g is formed on upper edges of rear ends of the cover portions 74c.

The tail cover 74 is mounted to a vehicle body as shown in FIG. 3 with the following structure. The tail cover 74 is mounted by engaging the positioning portion 74g with an engagement projection 46c of the rear cover 46 from the rear of a vehicle to position the same, engaging the left and right mount pieces 74d, 74d with a cross member 5d, which Connects the left and right seat rails 5, 5 mutually with a grommet 47 therebetween, by projections 42e, 42e of the left and right rear side covers 42, 42, engaging projections 39d of the rear fender portions 39b with the left and right rear mount seats 74f, 74f with a grommet 53 therebetween, and clamping and fixing the left and right front mount seats 74e, 74e together with the rear fender portions 39b to the left and right rear side covers 42, 42 by mount screws 54, 54, which are inserted from under.

An outer peripheral engagement groove 74h is formed on an outer peripheral edge of the tail cover 74 to extend therealong. An inner peripheral engagement groove 74i is formed on a peripheral edge of an opening of the reflector recess 74a.

Rearwardly extending boss portions 74j, 74j are formed on left and right ends of the reflector recess 74a. Also, mount seats 72a, 72a and 73a, 73a in the form of a bottomed cylinder are formed on the inner lens 72 and the outer lens 73 to forwardly project in opposition to the left and right boss portions 74j, 74j.

The inner lens 72 and the outer lens 73 are mounted detachably to the tail cover 74 by engaging an outer peripheral edge 72b of the inner lens 72 into the inner peripheral engagement groove 74i, engaging an outer peripheral edge 73b of the outer lens 73 into the outer peripheral engagement groove 74h with a sealing member 76 therebetween, and inserting left and right mount bolts 77, 77 into the mount seats 72a, 72a and 73a, 73a from the rear to clamp and fix the same to the boss portions 74j, 74j.

A light shielding portion 72c is formed centrally in the vehicle width direction to be opposed to the lamp bulb 70 of the inner lens 72. The light shielding portion 72c is substantially saw-toothed as viewed in a vertically extending cross section and structured to be lower in light transmittance than other portions of the inner lens 72 to prevent light from the lamp bulb 70 from transmitting to the rear. Thereby, as viewed from the rear of a vehicle, the lamp bulb 70 is covered by the light shielding portion 72c and is hard to see.

As shown in FIGS. 6 and 8, the tail light 43 is structured so that light from the lamp bulb 70 is varied in flux density (radiant energy) about left and right set points 'a', a distance from the lamp bulb 70 and according to a distance from the left and right set points 'a'. More specifically, the set points 'a' are maximum in flux density and the flux density is decreased as distance increases from the set point 'a'. Set points 'a' are set on left and right sides interposed by the light shielding portion 72c.

A reflective surface formed on the reflector 71 and a light transmitting surface formed on the inner lens 72 are combined such that the flux density is varied according to a distance from the left and right set points 'a'. This construction is described in more detail below.

As viewed from the rear, the reflector 71 is formed with a plurality of reflective surfaces b1, b2, b3, b4, that define longitudinally (vertically) extending convex ridges. The reflective surfaces b1, b2, b3, b4 of the reflector 71 are structured so that light from the lamp bulb 70 is reflected toward the rear of a vehicle, and structured so that an effective area, in which the light is reflected effectively toward the rear of a vehicle, becomes maximum on the reflective surface b1 closest to the set points 'a' and is gradually decreased on surfaces b2, b3, b4 as they become more distant therefrom. That is, a reflected light from the reflective surface b1 closest to the set points 'a' is maximum in flux density and a reflected light from the respective reflective surfaces b2, b3, b4, which are distant outwardly left and right from the set points 'a', is successively decreased in flux density.

The inner lens 72 is formed with a plurality of light transmitting surfaces c1, c2, c3, c4, which define laterally (in the vehicle width direction) extending convex ridges. The respective light transmitting surfaces c1, c2, c3, c4 of the inner lens 72 are structured so that light from the reflective surface of the reflector 71 is permitted to transmit therethrough, and structured so that an effective area, in which the light is transmitted effectively, becomes maximum on the light transmitting surface c1 closest to the set points 'a' and is gradually decreased on surfaces c2, c3, c4 as they become more distant therefrom. That is, a transmitted light from the light transmitting surface c1 close to the set points 'a' is maximum in flux density and a transmitted light from the respective light transmitting surfaces c2, c3, c4, which are distant upward and downward from the set points 'a', is successively decreased in flux density.

When the respective reflective surfaces b1-b4 of the reflector 71 and the respective light transmitting surfaces c1-c4 of the inner lens 72 are overlapped in a longitudinal direction, lattice-shaped intersecting portions d1, d2, d3, . . . , dn having different areas are formed. In the respective intersecting portions d1, d2, d3, . . . , dn, the intersecting portion d1 positioned close to the set points 'a' is larger in area than the intersecting portions d2, . . . , dn positioned more distant from the set points 'a'. More specifically, the intersecting portions d1, d2, d3, . . . , dn are decreased in area successively as it goes outward in a vertical direction and outward in the vehicle width direction with the set points 'a' as centers. Thereby, as viewed from the rear of a vehicle, substantially circular-shaped light sources 'e', 'e' centering on the left and right set points 'a', 'a' are formed.

Since the tail light 43 according to the embodiment is structured so that light from the lamp bulb 70 is reflected toward the rear of a vehicle so that the left and right set points 'a', 'a' distant from the lamp bulb 70 are maximum in flux density, an outward appearance, in which the light sources 'e', 'e' centering on the left and right set points 'a', 'a' distant from the lamp bulb 70 seem to be present is obtained with one lamp bulb 70, so that improved visibility and outward appearance is achieved without increased size and cost. This feature is not present in the related art.

According to the embodiment, since a light shielding portion 72c lower in light transmittance than other portions is formed centrally in the vehicle width direction in opposition to the lamp bulb 70 of the inner lens 72, the lamp bulb 70 is covered by the light shielding portion 72c and is hard to see from the rear of the vehicle. Further, the left and right set points 'a', 'a' appear as light sources, so that an outward appearance of two light sources is obtained with one lamp bulb 70.

Since the left and right set points 'a', 'a' are provided on both sides of light shielding portion 72c in the vehicle width direction, the outward appearance of two light sources is further enhanced.

According to the embodiment, since the reflective surfaces b1-b4 formed on the reflector 71 and the light transmitting surfaces c1-c4 formed on the inner lens 72 are combined to regulate set points 'a', 'a' to be maximum in flux density, the set points 'a', 'a' are able to appear as light sources with a simple construction.

More specifically, a plurality of longitudinally extending reflective surfaces b1, b2, b3, b4 are formed on the reflector 71. The reflective surface b1 closest to the set points 'a' is maximum in effective reflection area, while the reflective surfaces b2, b3, b4, that are respectively more distant from the set points 'a', gradually decrease in effective reflection area. The inner lens 72 is formed with a plurality of light transmitting surfaces c1, c2, c3, c4 that extend laterally. The light transmitting surface c1 closest to the set points 'a' is maximum in effective light transmitting area, while the light transmitting surfaces c2, c3, c4, that are respectively more distant from the set points 'a', gradually decrease in effective light transmitting area. Consequently, the intersecting portion d1 positioned closest to the set points 'a' among the intersecting portions d1, d2, d3, . . . , dn of the respective reflective surfaces b1-b4 and the respective light transmitting surfaces c1-c4 is maximum both in effective reflection area and effective light transmitting area, while the intersecting portions d2, . . . , dn positioned gradually more distant from the set points 'a' are gradually decreased both in effective reflection area and effective light transmitting area. The result is light sources 'e', 'e' centering on the left and right set points a, a.

In addition, while the embodiment has been described with respect to the case where the intersecting portion dl positioned close to the set points 'a' is larger in effective area (effective reflection and light transmitting area) than the intersecting portions d2, . . . , dn positioned more distant from the set points 'a', the invention is not limited thereto and various modifications are conceivable. For example, the intersecting portion positioned close to the set points can be made smaller in effective area than the intersecting portions positioned on the periphery of the set points and the intersecting portions positioned outside the periphery of the set points can be made substantially equal in effective area to the intersecting portion positioned close to the set points. In such case, a ring-shaped light source centering on the set points is formed. Thus, it is possible to obtain an outward appearance that is rich in change.

While according to the embodiment, the reflector 71 is formed with the reflective surfaces b1-b4, which comprise longitudinally extending convex ridges, and the inner lens 72 is formed with the light transmitting surfaces c1-c4, which comprise laterally extending convex ridges, the invention is not limited thereto.

FIGS. 10 and 11 show a modification of the first embodiment. This is an example, in which a reflector 71 is formed with reflective surfaces b1', b2', b3', b4', which comprise laterally extending convex ridges, and an inner lens 72 is formed with light transmitting surfaces c1', c2', c3', c4', which comprise longitudinally extending convex ridges. In this case, substantially the same effect as that in the embodiment is produced.

Further, while the embodiment adopts a construction, in which a combination of the reflector 71 and the inner lens 72 provides for regulation in flux density, the invention is not limited thereto. A construction is possible in which at least one of reflector 71 and inner lens 72 regulates flux density.

FIGS. 12 and 13 are views illustrating a tail light according to a second embodiment of the invention. The second embodiment is an example of a construction, in which a single reflector 72 brings about a change in flux density.

As shown in FIGS. 12 and 13, the reflector 72 is formed with a plurality of longitudinal reflective surfaces f1-f4, which define longitudinally extending convex ridges, and a plurality of lateral reflective surfaces g1-g4, which define laterally extending convex ridges, whereby intersecting portions h1, . . . , hn are different in effective area. The respective intersecting portions h1, . . . , hn partitioned by the longitudinal and lateral reflective surfaces f1-f4, g1-g4 are structured so that the intersecting portion h1 closest to the set points 'a', 'a' is larger in area than the intersecting portions h2, . . . , hn more distant therefrom.

FIGS. 14 and 15 are views illustrating a tail light according to a third embodiment of the invention. The third embodiment is an example of a construction, in which a single inner lens 72 brings about a change in flux density.

As shown in FIGS. 14 and 15, the inner lens 72 is formed with a plurality of longitudinal, light transmitting surfaces i1-i4, which define longitudinally extending convex ridges, and a plurality of lateral, light transmitting surfaces j1-j4, which define laterally extending convex ridges, whereby intersecting portions k1, . . . , kn are different in effective area. The respective intersecting portions k1, . . . , kn partitioned by the longitudinal and lateral, light transmitting surfaces i1-i4, j1-j4 are structured so that the intersecting portion k1 closest to the set points 'a', 'a' is larger in effective area than the intersecting portions k2, . . . , kn more distant therefrom. In this manner, substantially the same effect as that in the first embodiment is produced in the case where either of the reflector 71 and the inner lens 72 adopts a construction, in which a change in flux density is caused.

In addition, while the embodiment has been described with respect to the case where reflective surfaces of the reflector 71 and light transmitting surfaces of the inner lens 72 comprise convex ridges, they can also comprise concave ridges.

Also, while the embodiment has been described with respect to the case where the invention is applied to a tail light of a motorcycle, the lamp of the invention is also applicable to a head light as well as to lighting devices adopted in automobiles.

The particular embodiments of the invention described in this document should be considered illustrative, rather than restrictive. Modification to the described embodiments may be made without departing from the spirit of the invention as defined by the following claims.

The invention claimed is:

1. A tail light arranged on a rear end of a vehicle, the tail light comprising:
   a bulb;
   a reflector that reflects light from the bulb in a predetermined direction;
   a lens that transmits the reflected light; and
   a light shielding portion on a portion of the lens that is opposed to the bulb that lowers light transmittance relative to that in other portions of the lens,
   wherein flux density passing through a unit area in a unit time is varied about set points provided on both sides of the light shielding portion in a vehicle width direction, which are distant from the bulb, according to a distance from the set points.

2. The tail light according to claim 1, wherein the flux density is maximum at the set points.

3. The tail light according to claim 1, wherein at least one of the reflector and the lens is constructed to vary the flux density according to a distance from the set points.

4. The tail light according to claim 1, wherein the reflector and the lens combine to vary the flux density according to a distance from the set points.

5. A motorcycle comprising the tail light of claim 1.

6. A lamp comprising:
   a bulb;
   a reflector that reflects light from the bulb in a predetermined direction; and
   a lens that transmits the reflected light,
   wherein flux density passing through a unit area in a unit time is varied about a set point, which is distant from the bulb, according to a distance from the set point,
   wherein at least one of the reflector and the lens is constructed to vary the flux density according to a distance from the set point, and
   wherein the reflector comprises a plurality of partitioned reflective surfaces composed of convex or concave ridges, wherein reflective surfaces closer to the set point are larger in effective area than reflective surfaces positioned more distant from the set point.

7. The lamp according to claim 6, wherein the lens comprises a plurality of partitioned light transmitting surfaces composed of convex or concave ridges, wherein light transmitting surfaces closer to the set point are larger in effective area than light transmitting surfaces more distant from the set point.

8. A motorcycle comprising the lamp of claim 6.

9. A lamp comprising:
   a bulb;
   a reflector that reflects light from the bulb in a predetermined direction; and
   a lens that transmits the reflected light,
   wherein flux density passing through a unit area in a unit time is varied about a set point, which is distant from the bulb, according to a distance from the set point,
   wherein the reflector and the lens combine to vary the flux density according to a distance from the set point, and
   wherein the reflector is formed with a plurality of longitudinally or laterally extending reflective surfaces composed of convex or concave ridges, the lens is formed with a plurality of laterally or longitudinally extending light transmitting surfaces composed of convex or concave ridges, and the convex or concave ridges on the reflective surfaces and the light transmitting surfaces are structured so that intersecting portions of the convex or concave ridges closer to the set point are larger in area than intersecting portions of the convex or concave ridges more distant from the set point.

10. A motorcycle comprising the lamp of claim 9.

* * * * *